US008901800B2

(12) United States Patent
Mizutani (10) Patent No.: US 8,901,800 B2
(45) Date of Patent: Dec. 2, 2014

(54) MOTOR

(75) Inventor: Nobuo Mizutani, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 494 days.

(21) Appl. No.: 13/331,729

(22) Filed: Dec. 20, 2011

(65) Prior Publication Data

US 2012/0161559 A1 Jun. 28, 2012

(30) Foreign Application Priority Data

Dec. 28, 2010 (JP) ................................. 2010-291607
Dec. 28, 2010 (JP) ................................. 2010-291609

(51) Int. Cl.
H01R 39/38 (2006.01)
H02K 7/116 (2006.01)
H02K 5/14 (2006.01)

(52) U.S. Cl.
CPC .............. *H02K 5/148* (2013.01); *H02K 7/1166* (2013.01)
USPC ....................................................... 310/241

(58) Field of Classification Search
USPC ............................... 310/71, 83, 239, 241, 242
See application file for complete search history.

(56) References Cited

U.S. PATENT DOCUMENTS

| 6,452,297 | B2 | 9/2002 | Yamamoto et al. | |
|---|---|---|---|---|
| 6,677,693 | B2* | 1/2004 | Ooyama | 310/239 |
| 6,759,783 | B2 | 7/2004 | Hager et al. | |
| 6,921,994 | B2* | 7/2005 | Kawakami et al. | 310/75 R |
| 6,922,003 | B2 | 7/2005 | Uchida | |
| 6,998,741 | B2 | 2/2006 | Breynaert et al. | |
| 7,417,352 | B2 | 8/2008 | Hirano et al. | |
| 7,791,243 | B2* | 9/2010 | Mizutani | 310/242 |
| 2008/0284272 | A1 | 11/2008 | Honda et al. | |
| 2009/0001829 | A1 | 1/2009 | Uchimura et al. | |
| 2012/0161560 | A1 | 6/2012 | Mizutani | |

FOREIGN PATENT DOCUMENTS

| JP | 539167 U | 5/1993 |
|---|---|---|
| JP | 2003-018794 A | 1/2003 |
| JP | 2003523708 A | 8/2003 |
| JP | 2009011077 A | 1/2009 |
| WO | WO0161828 A1 | 8/2001 |

* cited by examiner

*Primary Examiner* — Dang Le
(74) *Attorney, Agent, or Firm* — Faegre Baker Daniels LLP (57) ABSTRACT

A motor includes a motor portion and a speed reducing portion. In the motor portion, a brush holder that holds a feeder brush for feeding electric power to a commutator is arranged at an opening of a yoke. The speed reducing portion has a speed reducing mechanism, which is arranged in a gear housing. The speed reducing mechanism outputs drive force produced by a rotary shaft of the motor portion with the rotating speed of the rotary shaft reduced by the speed reducing mechanism. A brush holder includes a support pillar projecting toward the gear housing and an urging member that urges the feeder brush against the commutator. A positioning portion for positioning the brush holder with respect to the gear housing in a direction perpendicular to the axial direction is formed at a distal end portion of the support pillar.

17 Claims, 6 Drawing Sheets

MOTOR

CROSS-REFERENCE TO RELATED APPLICATION

This application claims priority to Japanese Application No. 2010-291607, filed Dec. 28, 2010, and Japanese Application No. 2010-291609, filed Dec. 28, 2010, all of which are herein incorporated by reference in their entirety.

TECHNICAL FIELD

The present invention relates to a motor used as a drive source, for example, a power window apparatus.

BACKGROUND

Conventionally, as described in Japanese Laid-Open Patent Publication No. 2003-18794, for example, this type of motor is configured by a motor portion having a rotor received in a yoke housing and a speed reducing portion mounted at an output-side end portion of the motor portion to reduce the rotating speed of the motor portion. In the motor portion, the rotary shaft of the rotor projects from an opening of the yoke housing at the axial output side toward the speed reducing portion. A brush holder for holding a feeder brush is arranged in the opening of the yoke housing to supply electric power to a commutator. The speed reducing portion includes a gear housing, which is fixed to an output-side end portion of the yoke housing through a fastening member such as a screw. The gear housing accommodates members for configuring a speed reducing mechanism, including a worm gear and a worm wheel. Drive force produced by the motor portion is output in a state in which the rotating speed is reduced by the speed reducing mechanism.

The motor includes a positioning projection, which projects axially in the gear housing. A positioning hole, with which the positioning projection is engaged, is formed in an inner surface of the brush holder. To join the motor portion and the speed reducing portion together, the positioning projection of the gear housing is engaged with the positioning hole of the brush holder. The motor portion and the speed reducing portion are thus positioned in a direction perpendicular to the axial directions of the motor portion, which includes the brush holder, and the gear housing. This facilitates joint of the motor portion and the speed reducing portion.

The brush holder includes an urging member for pressing the brush against the commutator, a noise suppression element such as a capacitor, and a terminal member for electrical connection of a noise suppression element and the brush. These components are arranged at a high density to reduce the size of the brush holder in a direction perpendicular to the axial direction. If the brush holder includes positioning portions as described above, the brush holder is enlarged in the direction perpendicular to the axial direction to have space for mounting the positioning portions. In this regard, more improvement is necessary.

SUMMARY

Accordingly, it is an objective of the present invention to provide a small-sized motor that has a positioning portion in a brush holder.

To achieve the foregoing objective and in accordance with one aspect of the present invention, a motor that includes a motor portion and a speed reducing portion connected to the motor portion is provided. The motor portion includes a yoke housing having an opening, a rotary shaft that projects from the opening of the yoke housing and defines the axial direction of the motor, a commutator, a feeder brush for supplying electric power to the commutator, and a brush holder that holds the feeder brush. The speed reducing portion includes a gear housing mounted at the opening of the yoke housing, and a speed reducing mechanism arranged in the gear housing. The speed reducing mechanism outputs drive force produced by the rotary shaft of the motor portion while reducing the rotating speed of the rotary shaft. The motor further includes at least one support pillar, an urging member, and a positioning portion. The support pillar is provided in the brush holder, projects toward the gear housing, and has a distal end portion. The urging member is arranged in the brush holder and supported by the support pillar, and presses the feeder brush against the commutator. The positioning portion is provided at the distal end portion of the at least one support pillar, and positions the brush holder with respect to the gear housing in a direction perpendicular to the axial direction of the rotary shaft.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

A motor according to an embodiment of the present invention will now be described with reference to the attached drawings.

Figure 1:
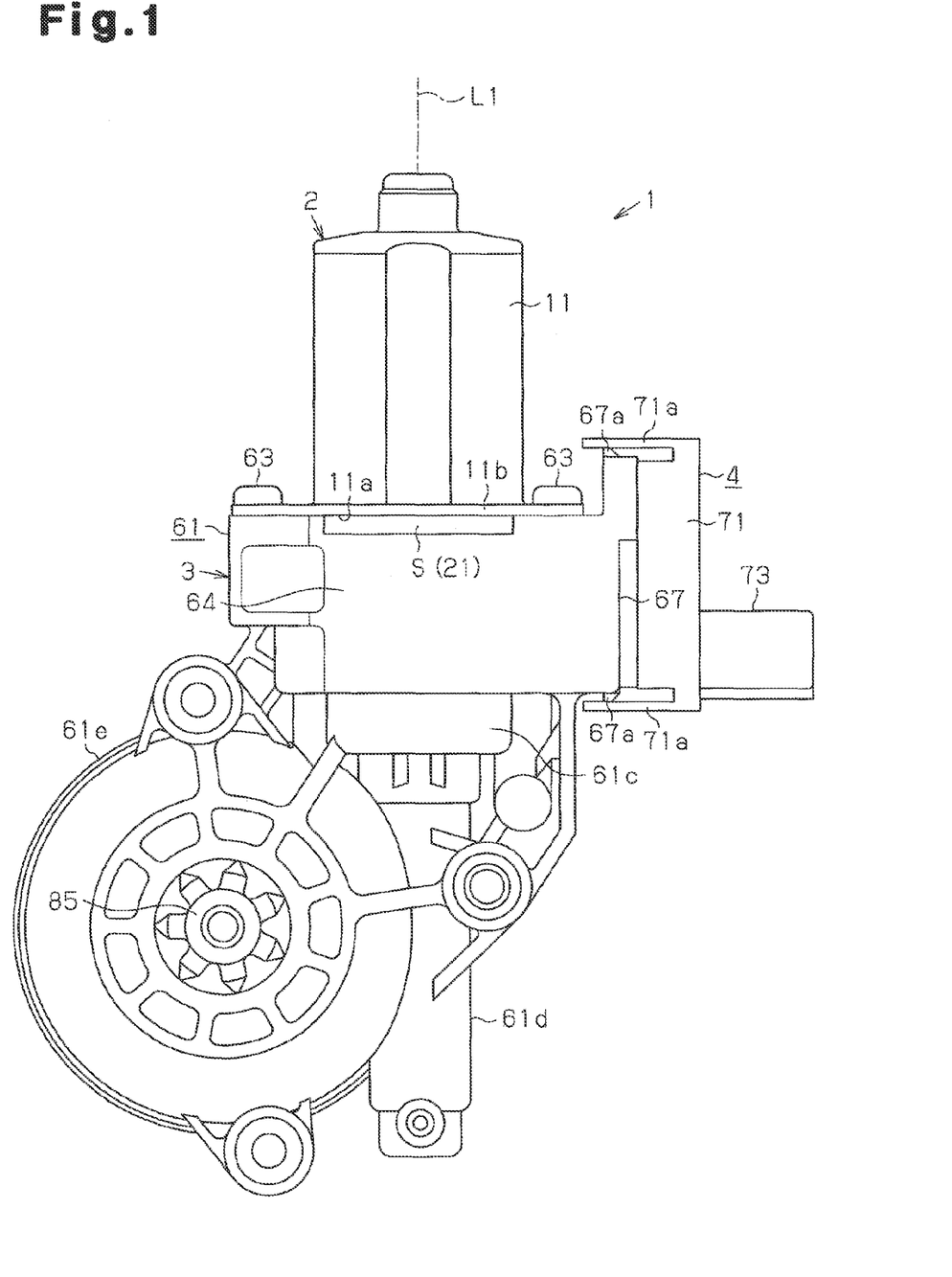
FIG. 1 is a side view showing a motor according to one embodiment of the present invention.

As shown in FIG. 1, a motor 1 according to the illustrated embodiment is used as a drive source for a power window apparatus for electrically raising and lowering a window glass of a vehicle. The motor 1 includes a motor portion 2, which is located upward as viewed in FIG. 1, a speed reducing portion 3 arranged at the output side of the motor portion 2 (below the motor portion 2), and a connector portion 4, which is mounted at a side of the speed reducing portion 3 (as viewed to the right in the drawing). The motor 1 as a whole has a flat shape extending perpendicularly to the axis L1. As viewed in the axial direction, the elongated direction (the leftward-rightward direction in FIG. 1) is defined as a lateral direction and the transverse direction (a direction perpendicular to the sheet surface of FIG. 1) is defined as a thickness direction. In other words, the axial direction, the lateral direction, and the thickness direction of the motor 1 extend perpendicularly to one another.

[Configuration of Motor Portion]

Figure 2:
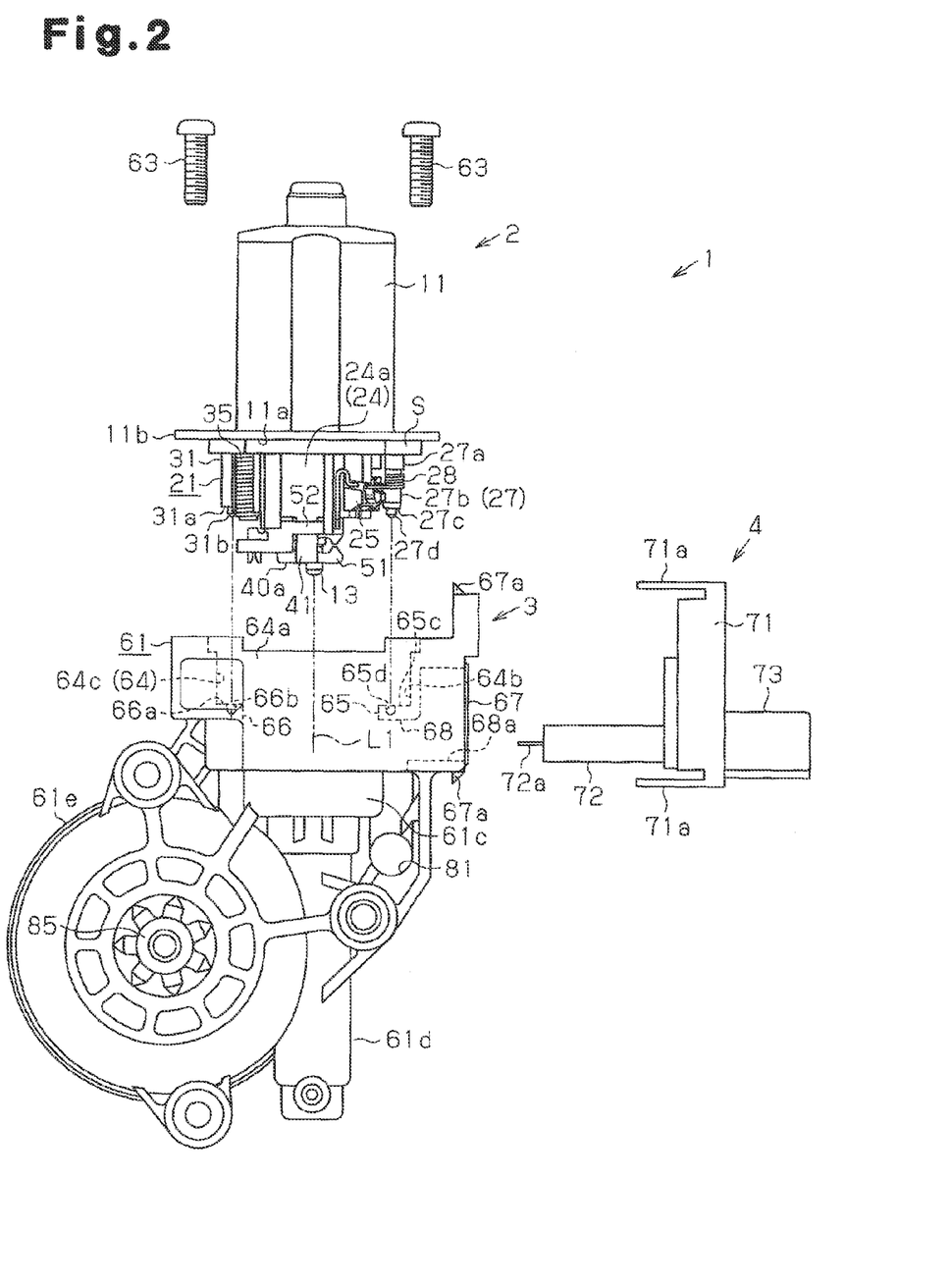
FIG. 2 is an exploded side view showing the motor illustrated in FIG. 1.
Figure 3:
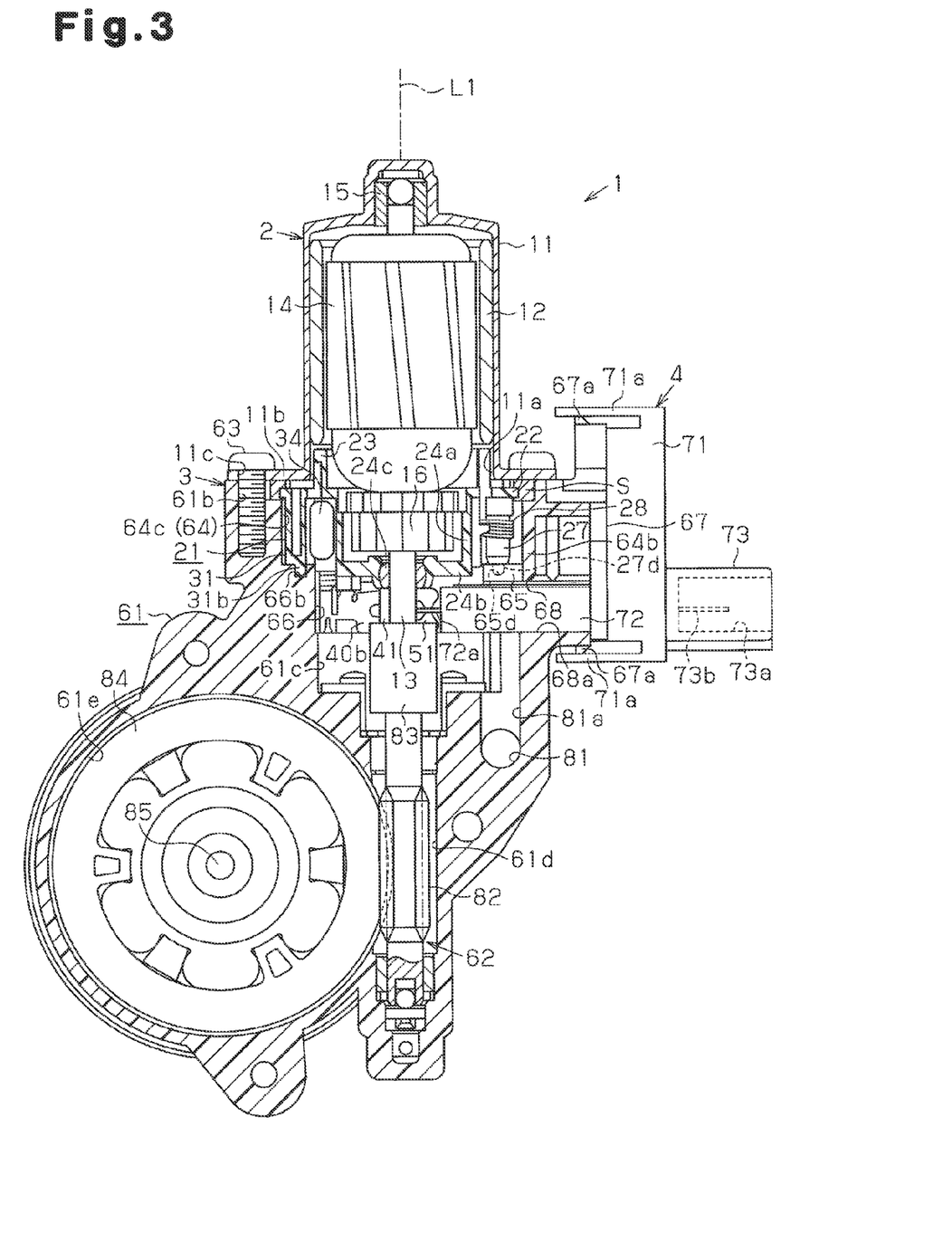
FIG. 3 is a cross-sectional view showing the motor illustrated in FIG. 1.

With reference to FIGS. 1, 2, and 3, a yoke housing 11 (hereinafter, referred to simply as a yoke 11) of the motor portion 2 has a tubular shape having a closed axial end portion (a closed upper end portion as viewed in FIG. 1). The yoke 11 has an opening 11a at the other axial end portion (the output-side end portion). A flange 11b, which extends radially outward, is formed at the opening 11a.

As illustrated in FIG. 3, a magnet 12 is fixed to the inner peripheral surface of the yoke 11. An armature 14 having a pillar-like rotary shaft 13 is arranged inside the magnet 12. The rotary shaft 13 of the armature 14 is arranged at a radial central position in the yoke 11. A basal end portion (an upper end portion in FIG. 1) of the rotary shaft 13 is rotatably supported by a bearing 15, which is formed at the center of the bottom of the yoke 11. The armature 14 rotates integrally with the rotary shaft 13 about the axis L1 of the rotary shaft 13. A distal end portion of the rotary shaft 13 projects from the opening 11a of the yoke 11 to the exterior of the yoke 11. A commutator 16 is fixed to the projecting portion of the rotary shaft 13. In other words, the commutator 16 is arranged at a position outside the yoke 11. The commutator 16 and the distal end portion of the rotary shaft 13 are received in a gear housing 61, which is formed of resin and a component of the speed reducing portion 3.

[Configuration of Brush Holder]

A brush holder 21 is formed at the opening 11a of the yoke 11. The brush holder 21 has a flat plate-like base 22, which is arranged outside the opening 11a of the yoke 11. The length of the base 22 in a direction perpendicular to the axial direction is slightly greater than the corresponding size of the opening 11a of the yoke 11. A fixed wall portion 23, which extends axially along the inner peripheral surface of the yoke 11, is formed in the base 22. The fixed wall portion 23 is inserted into and fixed to the interior of the yoke 11 via the opening 11a. A sealing member S, which is formed of elastomer, is arranged along an outer peripheral portion of the base 22. The sealing member S has a U-shaped cross section in such a manner as to hold the outer peripheral portion of the base 22 in the axial direction. The sealing member S is clamped axially between the flange 11b of the yoke 11 and the gear housing 61. The sealing member S thus seals the opening 11a of the yoke 11 and the opening of the gear housing 61. This prevents liquid from entering the interior of the yoke 11 and the interior of the gear housing 61.

Figure 4:
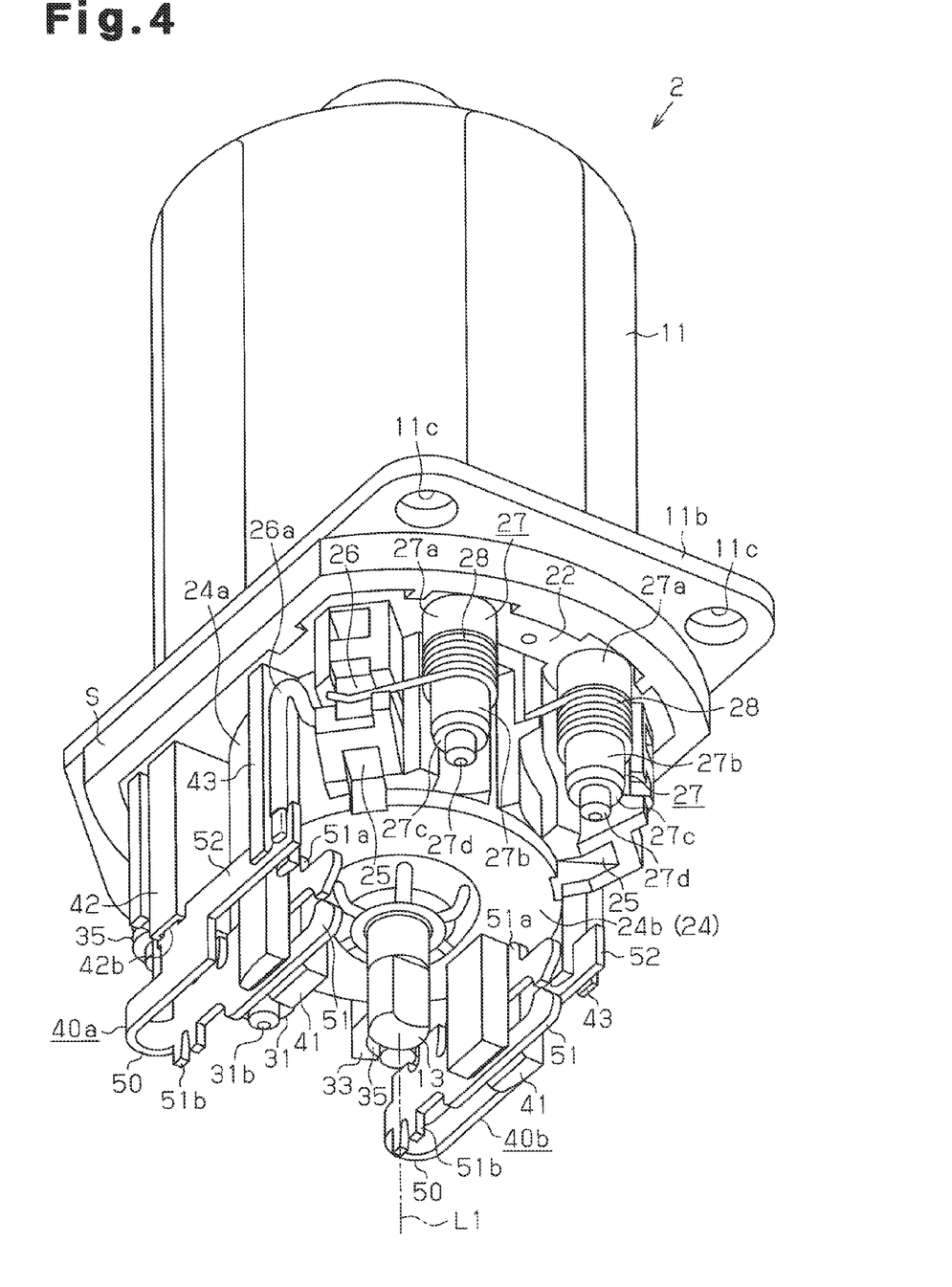
FIG. 4 is a perspective view showing a motor portion of the motor illustrated in FIG. 1.
Figure 5:
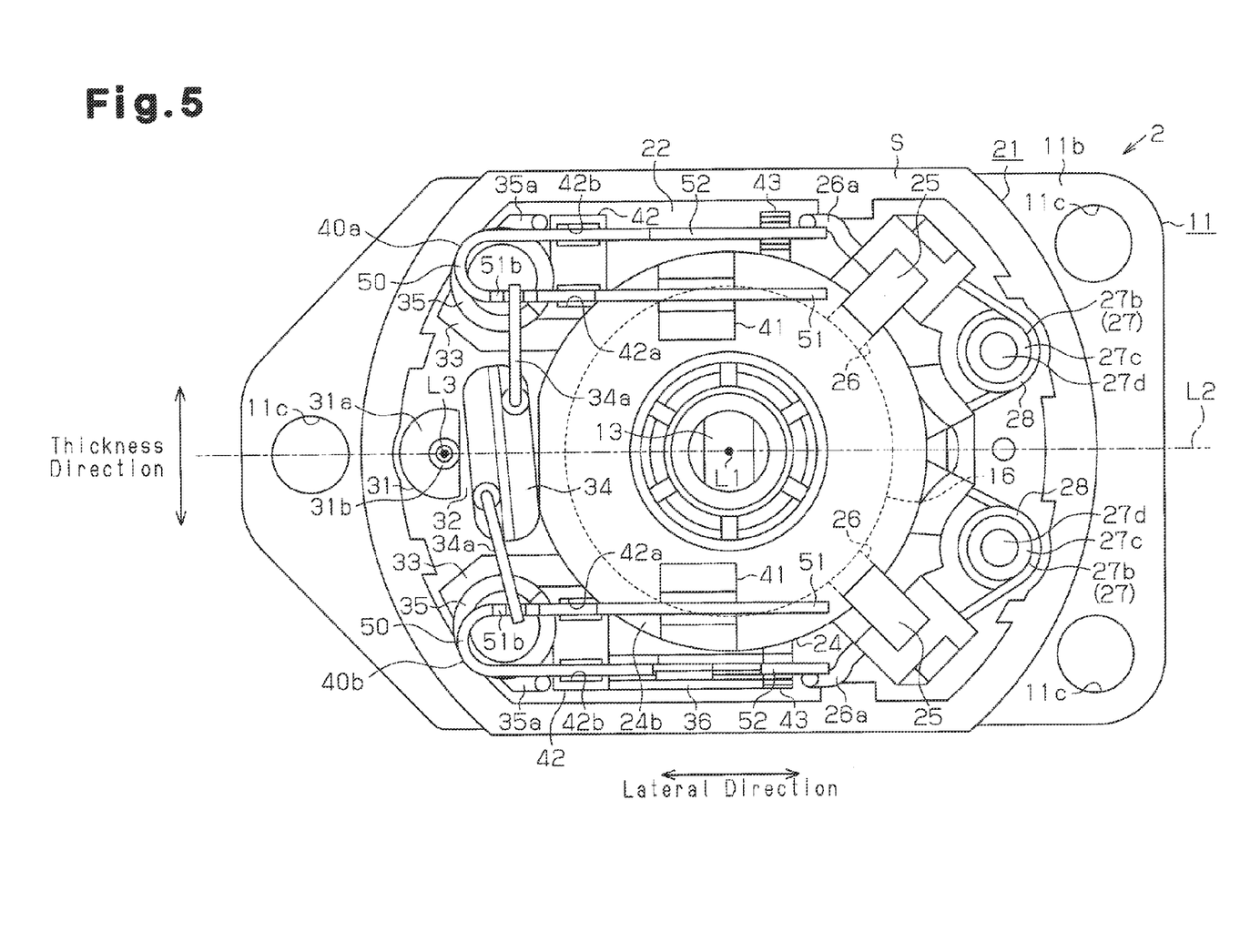
FIG. 5 is a plan view showing the motor portion illustrated in FIG. 4 as viewed from the axial output side.

A substantially cup-like cover 24, which is configured by a peripheral wall portion 24a and a circular wall portion 24b, is formed in the base 22. The peripheral wall portion 24a extends axially from the lower end surface of the base 22, which is the end surface at the opposite side to the yoke 11, and is arranged substantially around the outer periphery of the commutator 16. The circular wall portion 24b is formed at the lower end of the peripheral wall portion 24a and covers the commutator 16. A bearing 24c, which rotatably supports the rotary shaft 13 as illustrated in FIG. 3, is arranged at the center of the circular wall portion 24b. Referring to FIGS. 4 and 5, a pair of brush accommodating portions 25, which extend radially outward from the peripheral wall portion 24a of the cover 24, are formed at the lower end surface of the base 22 and spaced apart circumferentially at the interval of 90 degrees. More specifically, as illustrated in FIG. 5, the brush accommodating portions 25 are arranged at the opposing positions with respect to the straight line L2 (hereinafter, referred to as the lateral line L2), which extends perpendicularly to the axis L1 of the rotary shaft 13 and along the lateral direction of the motor 1, each at the angle of 45 degrees.

As illustrated in FIGS. 4 and 5, each of the brush accommodating portions 25 is shaped like a box having openings at two radial sides. In other words, each brush accommodating portion 25 has a hollow shape in such a manner as to allow communication between the interior and the exterior of the cover 24. The brush accommodating portions 25 each accommodate a feeder brush 26, which is shaped substantially as a rectangular parallelepiped, in a radially movable manner. A distal end portion, which is a radial inner end portion, of each of the feeder brushes 26 projects from the corresponding one of the brush accommodating portions 25 into the inner side of the peripheral wall portion 24a of the cover 24 and is held in contact with the outer peripheral surface of the commutator 16 in the cover 24.

A pair of support pillars 27, which project from the lower end surface of the base 22 to the opposite axial side to the yoke, are formed at a position between the two brush accommodating portions 25 in a circumferential direction. The brush accommodating portions 25 and the support pillars 27 are arranged focally at one side in the lateral direction with respect to the axis L1 of the rotary shaft 13, or, in other words, at the right side as viewed in FIG. 5. The two brush accommodating portions 25 are shaped symmetric with respect to the lateral line L2. The two support pillars 27 are shaped to be symmetric with respect to the lateral line L2.

Each of the support pillars 27 has a circular cross section. Each support pillar 27 has a large diameter portion 27a, which is arranged at a basal end portion of the support pillar 27, and a support portion 27b extending axially from the large diameter portion 27a. The coil portion of a torsion spring 28 serving as an urging member is wound around and held by each of the support portions 27b. The diameter of the large diameter portion 27a is greater than the diameter of the support portion 27b. In other words, the portion between the support portion 27b and the large diameter portion 27a is shaped as a step, which allows axial positioning of the torsion spring 28.

A distal end portion 27c, which is an axial end, of each support pillar 27 is shaped as a flat surface extending perpendicular to the axis L1. A first positioning projection 27d (a holder positioning portion), which projects in the axial direction, is formed at the center of the distal end portion 27c. The positioning projection 27d is formed in a pillar-like shape having a diameter smaller than the support pillar 27. The axis of the positioning projection 27d coincides with the axis of the support pillar 27. The portion between the positioning projection 27d and the support pillar 27 is formed in a stepped manner.

An end of each torsion spring 28 supported by the corresponding support pillar 27 is maintained by the peripheral wall portion 24a of the cover 24. The other end of the torsion spring 28 is held in contact with the basal end portion of the corresponding feeder brush 26 in a radial direction to press the feeder brush 26 radially inward. This urges the feeder brush 26 radially inward, thus pressing the distal end portion of the feeder brush against the outer peripheral surface of the commutator 16 in the cover 24.

A projecting pillar 31, which projects from the lower end surface of the base 22 to the opposite axial side to the yoke 11, is formed at a lateral side of the cover 24, which is the opposite side to the side at which the brush accommodating portions 25 and the support pillars 27 are arranged. The projecting pillar 31 has a D-shaped cross section including a cut plane at the side facing the cover 24. The projecting pillar 31 is aligned with the rotary shaft 13 in the lateral direction. The central axis L3 of the projecting pillar 31 extends parallel to the axis L1 of the rotary shaft 13 and perpendicular to the lateral line L2. In other words, the two support pillars 27 are arranged to be symmetric with respect to the straight line (in the illustrated embodiment, the lateral line L2) that extends on the central axis L3 of the projecting pillar 31 and the axis L1 of the rotary shaft 13, as viewed in the axial direction. The two brush accommodating portions 25 are arranged to be symmetric with respect to the lateral line L2. The two feeder brushes 26 are arranged to be symmetric with respect to the lateral line L2.

The projecting pillar 31 has a distal end portion 31a, which is shaped as a flat surface extending perpendicular to the axis L1. A second positioning projection 31b (a projecting pillar positioning portion), which projects in the axial direction, is formed at the center of the distal end portion 31a. The positioning projection 31b is shaped as a pillar having a diameter smaller than the diameter of the projecting pillar 31. The axis of the positioning projection 31b coincides with the axis of the projecting pillar 31. The portion between the positioning projection 31b and the projecting pillar 31 has a stepped shape.

Two holding wall portions 33, each of which configures a portion of a capacitor accommodating portion 32, are formed at two circumferential sides of the projecting pillar 31. The capacitor accommodating portion 32 is configured by the holding wall portions 33, the projecting pillar 31, and the cover 24. A capacitor 34 (FIG. 5) is mounted in the capacitor accommodating portion 32 from the opposite axial side to the yoke 11. A choke coil 35 is maintained at the side of each of the holding wall portions 33 opposite to the capacitor 34. The axis of each of the choke coils 35 extends parallel to the axis L1 of the motor portion 2. The two holding wall portions 33 are arranged to be symmetric with respect to the lateral line L2. The two choke coils 35 are arranged to be symmetric with respect to the lateral line L2.

In the brush holder 21, a pair of terminals 40a, 40b are arranged at the side opposite to the yoke 11 in the axial direction with respect to the cover 24. The terminal 40a includes first, second, and third terminal holding portions 41, 42, 43 for holding the terminal 40a. The terminal 40b includes other first to third terminal holding portions 41, 42, 43 for holding the terminal 40b. The two sets of the first to third terminal holding portions 41 to 43 are arranged to be symmetric with respect to the lateral line L2 of the motor 1. The terminals 40a, 40b are arranged to be symmetric with respect to the lateral line L2 of the motor 1.

The first terminal holding portions 41 are arranged at the opposite sides of the rotary shaft 13 of the motor 1 in the thickness direction and extend axially from the circular wall portion 24b of the cover 24. Each of the first terminal holding portions 41 is shaped in a fork-like manner in such a manner as to clamp the associated one of the flat plate-like terminals 40a, 40b in the direction of the plate thickness of each terminal 40a, 40b. Each of the second terminal holding portions 42 is projected from the lower end surface of the base 22 at the lateral side of the corresponding one of the choke coils 35 facing the cover 24. A first fixing recess 42a and a second fixing recess 42b are formed in the distal end surface of each second terminal holding portion 42 and aligned in the thickness direction of the motor 1. Specifically, the first fixing recess 42a is arranged at the inner side and the second fixing recess 42b is located at the outer side in the thickness direction of the motor 1. Each of the third terminal holding portions 43 is arranged circumferentially adjacent to the corresponding one of the brush accommodating portions 25 at the opposite position to the corresponding one of the support pillars 27. The third terminal holding portions 43 extend axially from the lower end surface of the base 22. Each third terminal holding portion 43 has a distal end portion that is formed in a fork-like shape in such a manner as to clamp the corresponding flat plate-like terminal 40a, 40b in the plate thickness direction of the terminal 40a, 40b, as in the case of the first terminal holding portions 41.

The terminals 40a, 40b are each formed by punching out a conductive metal plate through pressing in accordance with a prescribed shape and then bending the obtained plate at a plurality of positions. Each of the terminals 40a, 40b has a U shape as viewed in the axial direction. The distal ends of the U shape face in the lateral direction of the motor 1. The terminals 40a, 40b are arranged at the opposite sides of the rotary shaft 13 in the thickness direction of the motor 1. In other words, the rotary shaft 13 is arranged between the terminals 40a, 40b, which are aligned in the thickness direction.

The terminals 40a, 40b each include a bent portion 50, which is arranged at the opposite axial side to the yoke 11 with respect to the corresponding choke coil 35, and a first terminal portion 51 and a second terminal portion 52, which extend straight and linearly from the bent portion 50 in the lateral direction as viewed in the axial direction. Each terminal portion 40a, 40b is formed in a U shape by the bent portion 50 and the terminal portions 51, 52 as viewed in the axial direction. The first and second terminal portions 51, 52 are aligned in the thickness direction of the motor 1. Specifically, the first terminal portions 51 are arranged at the positions overlapped with the positions of the circular wall portion 24b of the cover 24 and the commutator 16 in the axial direction. In contrast, the second terminal portions 52 are located at the positions that are not overlapped with the position of the cover 24 in the axial direction.

Each of the first terminal portions 51 is shaped like a fork that is divided into two axial portions at the lateral middle position. Specifically, each first terminal portion 51 is shaped in such a manner as to have an opening faced in the lateral direction as viewed in the thickness direction of the motor 1. The fork-like portion of the first terminal portion 51 is clamped by the corresponding first terminal holding portion 41 in the thickness direction of the motor 1. The first terminal portion 51 also includes an engagement projection 51a, which projects axially toward the cover 24. The engagement projection 51a contacts the first terminal holding portion 41 in the lateral direction of the motor 1.

A projection (not shown) that projects axially toward the cover 24 is formed at the position in each first terminal portion 51 corresponding to the corresponding second terminal holding portion 42. The projection is engaged with the first fixing recess 42a of the second terminal holding portion 42 to hold the first terminal portion 51 with respect to the second terminal holding portion 42. Each second terminal portion 52 also includes a similar projection (not shown). Through engagement between the projection and the second fixing recess 42b of the second terminal holding portion 42, the second terminal portion 52 is held with respect to the second terminal holding portion 42. Each second terminal portion 52 is clamped by the distal end portion of the corresponding third terminal holding portion 43 in the thickness direction of the motor 1.

In each of the terminals 40a, 40b, which are held by the brush holder 21, a pigtail 26a extending from the closer one of the feeder brushes 26 is welded onto an end of each second terminal portion 52 in the lateral direction of the motor 1. This electrically connects the second terminal portion 52 to the feeder brush 26 through the pigtail 26a.

Referring to FIG. 5, a pair of connecting end portions 34a, which extend from the capacitor 34, are welded onto and electrically connected to connecting portions 51*b*, each of which is formed at the basal end portion (the portion between the first terminal portion 51 and the bent portion 50) of the first terminal portion 51 of the corresponding terminal 40*a*, 40*b*. A connecting end portion 35*a* of each choke coil 35 is welded onto and electrically connected to the second terminal portion 52 of the closer terminal 40*a*, 40*b*. A thermistor 36, which is arranged outward from the second terminal portion 52 of the terminal 40*b* (the lower terminal as viewed in FIG. 5) in the thickness direction, is electrically connected to the second terminal portion 52.

[Configuration of Speed Reducing Portion]

As illustrated in FIG. 3, the speed reducing portion 3 includes the gear housing 61 and a speed reducing mechanism 62, which is accommodated in the gear housing 61.

Figure 6:
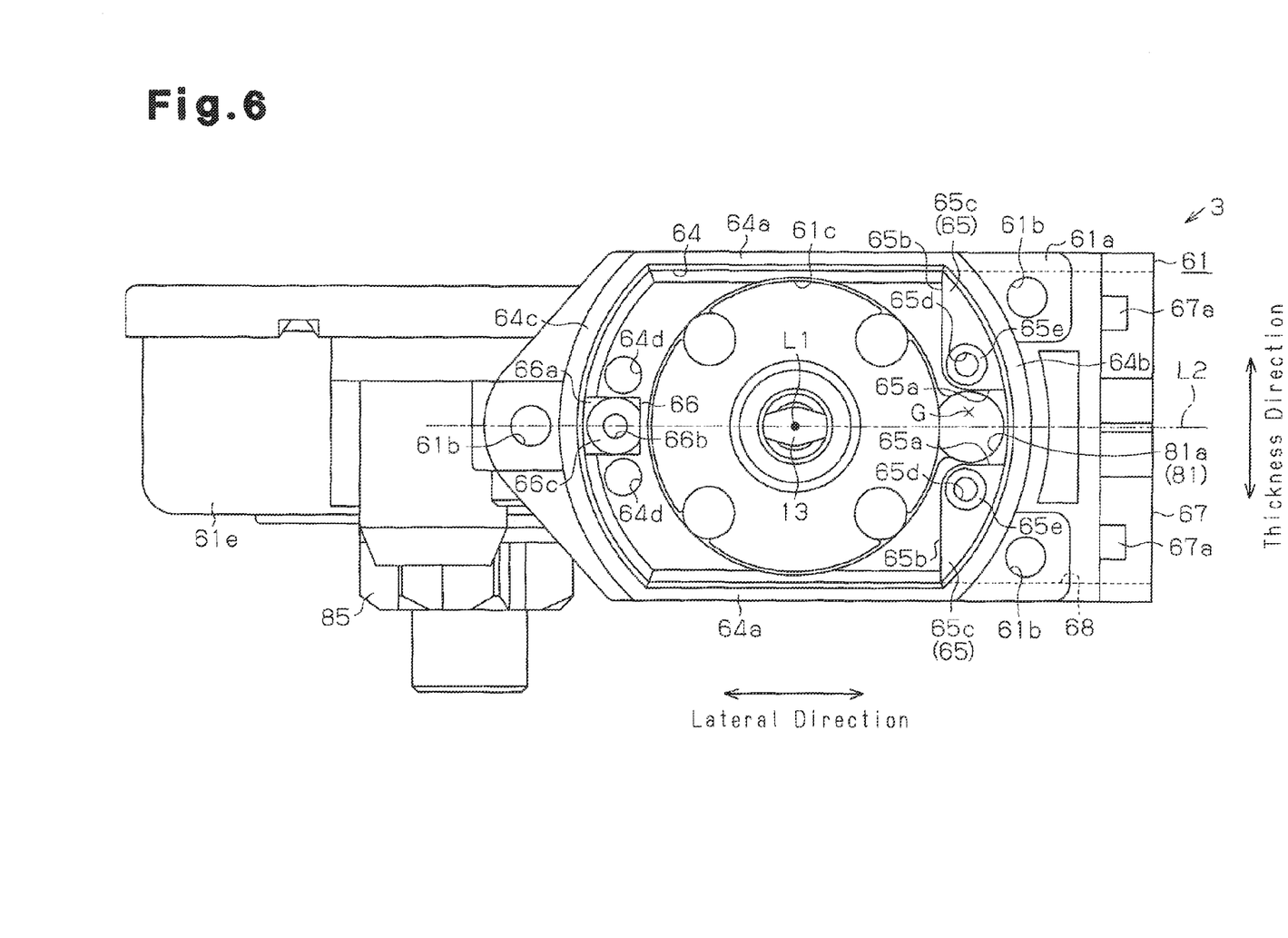
FIG. 6 is a plan view showing a gear housing of the motor illustrated in FIG. 1 as viewed in the axial direction.

With reference to FIG. 6, three threaded holes 61*b* are formed in an end surface 61*a* of the gear housing 61 facing the yoke 11. The end surface 61*a* is held in contact with the flange 11*b* of the yoke 11 in the axial direction. The end surface 61*a* is fixed to the flange 11*b* through three screws 63 (only two of them are shown in FIGS. 1 to 3), which are threaded into the threaded holes 61*b* via the screw insertion holes 11*c* formed in the flange 11*b* as shown in FIG. 5.

A holder accommodating portion 64, which has an axial opening facing the yoke 11, is formed in the end surface 61*a* of the gear housing 61 at a position radially inward from the threaded holes 61*b*. The holder accommodating portion 64 is configured to receive a portion of the brush holder 21, the commutator 16, and the rotary shaft 13 of the motor portion 2.

The holder accommodating portion 64 includes a pair of opposing wall portions 64*a*, which oppose each other in the thickness direction of the motor 1, and a pair of opposing wall portions 64*b*, 64*c*, which oppose each other in the lateral direction of the motor 1. As viewed in the axial direction, each of the opposing wall portions 64*a* extends straight and linearly in the lateral direction and the opposing walls 64*b*, 64*c* each form a curved shape that is projected radially outward.

As shown in FIGS. 2, 3, and 6, one of the laterally opposing wall portions (the opposing wall portion 64*b* arranged at the side close to the connector portion 4) includes a pair of projecting wall portions 65, which project into the interior of the holder accommodating portion 64 along a direction perpendicular to the axial direction. The projecting wall portions 65 are arranged to be symmetric with respect to the lateral line L2. Each of the projecting wall portions 65 has a first end surface 65*a*, which forms a flat surface perpendicular to the thickness direction of the motor 1, and a second end surface 65*b*, which extends perpendicularly to the first end surface 65*a*. The axial end surface (an axial end surface 65*c*) of each projecting wall portion 65 facing the yoke 11 is shaped as a flat surface perpendicular to the axis L1. The axial end surfaces 65*c* of the projecting wall portions 65 are arranged on one plane.

The first end surfaces 65*a* of the two projecting wall portions 65 oppose each other in the thickness direction. A circular first positioning recess 65*d* is formed in the axial end surface 65*c* of each of the projecting wall portions 65 in a recessed manner. The two first positioning recesses 65*d* are engaged with the corresponding two first positioning projections 27*d* of the brush holder 21. The opposing wall portion 64*c*, which is arranged at the opposite side to the side corresponding to the projecting wall portions 65, includes a projecting portion 66. The projecting portion 66 projects radially inward from the central portion of the opposing wall portion 64*c* in the thickness direction. An axial end surface 66*a* of the projecting portion 66 facing the yoke 11 is flush with the axial end surfaces 65*c* of the projecting wall portions 65. A circular second positioning recess 66*b* is formed in the end surface 66*a* in a recessed manner. The second positioning recess 66*b* is engaged with the second positioning projection 31*b* of the brush holder 21. As has been described, by engaging the first positioning projections 27*d* and the second positioning projection 31*b* of the brush holder 21 with the first positioning recesses 65*d* and the second positioning recess 66*b* of the gear housing 61, respectively, the brush holder 21 and the gear housing 61 are positioned in a direction perpendicular to the axial direction.

As illustrated in FIG. 6, the axial end surface 65*c* of each projecting wall portion 65 has a reference surface 65*e*, which is formed by raising the circumference of the first positioning recess 65*d*. The axial end surface 66*a* of the projecting portion 66 has a reference surface 66*c*, which is formed by raising the circumference of the second positioning recess 66*b*. The reference surfaces 65*e*, 66*c* are shaped as flat surfaces and arranged on one plane perpendicular to the axis L1 of the rotary shaft 13. The reference surface 65*e* of each projecting wall portion 65 contacts the distal end portion 27*c* of the corresponding support pillar 27 in the axial direction. The reference surface 66*c* of the projecting portion 66 contacts the distal end portion 31*a* of the projecting pillar 31 in the axial direction. As a result, the brush holder 21 is positioned in the axial direction. The axial projecting amounts of the reference surfaces 65*e*, 66*c* is only slight and not illustrated in FIGS. 2 and 3. Since the reference surfaces 65*e*, 66*c* are formed focally, tests for the axial positions and flatness of the reference surfaces 65*e*, 66*c* are easily conducted. Also, adjustment for arranging the reference surfaces 65*e*, 66*c* on one plane is facilitated.

As illustrated in FIGS. 2, 3, and 6, a connector attachment portion 67 is formed at the side surface of the gear housing 61 at the opposite side to a wheel accommodating portion 61*e* in the lateral direction of the motor 1. The connector portion 4 is detachably attached to the connector attachment portion 67 in the lateral direction. An inlet port 68, which has an opening at the opposite side to the wheel accommodating portion 61*e* in the lateral direction, is formed in the connector attachment portion 67. The wall of the inlet port 68 facing the motor portion 2 is configured by the projecting wall portions 65. The inlet port 68 communicates with the holder accommodating portion 64 in the gear housing 61. In other words, the holder accommodating portion 64 communicates with the exterior of the gear housing 61 through the inlet port 68. The inlet port 68 has a rectangular shape as viewed from the side corresponding to the opening of the inlet port 68.

With reference to FIGS. 2 and 3, the connector portion 4 includes a fixing portion 71, a control IC 72 (inserting portion), and an external connecting portion 73. The fixing portion 71 is fixed to the connector attachment portion 67. The control IC 72 is inserted into the inlet port 68. An external connector (not shown) for electrical signal input/output and power feeding is connected to the external connecting portion 73. The fixing portion 71 is fixed to the connector attachment portion 67 by engaging a pair of engagement pieces 71*a* with corresponding engagement projections 67*a*, which are formed at the opposite axial end portions of the connector attachment portion 67. The gap between the connector attachment portion 67 and the fixing portion 71 of the connector portion 4 is sealed to prevent liquid from entering the gap.

The control IC 72, which is shaped as a rectangular parallelepiped, is arranged in the fixing portion 71 and extends in the lateral direction of the motor 1. A pair of flat plate-like connecting terminals 72*a* are formed at a distal end portion (a lateral end portion) of the control IC 72 and project in the lateral direction of the motor 1. The connecting terminals 72*a* are aligned in the thickness direction of the motor 1. In FIGS. 2 and 3, only one of the connecting terminals 72a is shown. The control IC 72 is inserted into the inlet port 68 of the connector attachment portion 67 in the lateral direction. The two connecting terminals 72a of the control IC 72 are pressed into and electrically connected to the fork-shaped first terminal portions 51 of the corresponding terminals 40a, 40b, which are held by the brush holder 21, in the holder accommodating portion 64. An opening 73a, which is illustrated in FIG. 3, is formed in the external connecting portion 73 of the connector portion 4. An external connecting terminal 73b, which is electrically connected to the control IC 72, is formed at the opening 73a. The external connecting terminal 73b is electrically connected to the external connector, which is mounted in the external connecting portion 73.

The gear housing 61 has a vent hole 81, which communicates with the exterior through an inner opening 81a formed in a wall portion 68a of the inlet port 68 at the opposite side to the motor portion 2, as illustrated in FIG. 6. The inner opening 81a of the vent hole 81 is arranged at the position axially overlapped with the position of the gap G between the projecting wall portions 65, which are aligned in the thickness direction of the motor 1. As a result, when the gear housing 61 is molded, a slide mold (not shown) for shaping the inner opening 81a of the vent hole 81 may be removed axially from the gap G between the projecting wall portions 65. Also, the gear housing 61 is prevented from being enlarged in the direction perpendicular to the axial direction.

The vent hole 81 equilibrates the atmospheric pressure in the interior and the exterior of the gear housing 61 and prevents force from acting focally on a sealing portion for sealing the gear housing 61, such as the sealing member S. A waterproof sheet (not shown) for allowing air communication between the interior and the exterior of the gear housing 61 and preventing water from entering the gear housing 61 is arranged in the vent hole 81. The holder accommodating portion 64 and the wheel accommodating portion 61e, which will be described later, communicate with each other through communication holes 64d, which are formed at the opposite circumferential sides of the projecting portion 66 and extend in the axial direction.

The holder accommodating portion 64 communicates with a clutch accommodating portion 61c and a worm accommodating portion 61d. The clutch accommodating portion 61c is arranged axially downward from the holder accommodating portion 64 (at the opposite side to the yoke 11) and the worm accommodating portion 61d is located axially downward from the clutch accommodating portion 61c. A worm shaft 82 is supported in the worm accommodating portion 61d rotatably about the axis L1. The worm shaft 82 and the rotary shaft 13 of the motor portion 2 are connected to each other through a clutch 83, which is accommodated in the clutch accommodating portion 61c. The clutch 83 transmits torque from the rotary shaft 13 to the worm shaft 82 and, in response to input of torque from the worm shaft 82, generates break force to restrict rotation of the clutch 83. The joint portion of the clutch 83 connected to the rotary shaft 13 is arranged between the terminals 40a, 40b of the brush holder 21. This prevents enlargement of the motor 1 in the axial direction.

The wheel accommodating portion 61e, the interior of which communicates with the interior of the worm accommodating portion 61d, is formed at a side of the worm accommodating portion 61d in the direction perpendicular to the axial direction. The wheel accommodating portion 61e accommodates a disk-like worm wheel 84, which is meshed with the worm shaft 82. The worm wheel 84 is supported rotatably about the axis parallel to the thickness direction of the motor 1. The worm shaft 82 and the worm wheel 84 configure the speed reducing mechanism 62. Torque produced by the rotary shaft 13 is output from an output shaft 85, which rotates integrally with the worm wheel 84 as illustrated in FIG. 1, with a rotating speed reduced by the worm shaft 82 and the worm wheel 84. The output shaft 85 projects to the exterior of the gear housing 61 and is connected to a window glass of a vehicle through a non-illustrated window regulator.

Operation of the illustrated embodiment will hereafter be described.

Electric power from the external connector, which is attached to the connector portion 4, is supplied from the connecting terminals 72a of the control IC 72 to the commutator 16 of the armature 14 via the terminals 40a, 40b and the feeder brushes 26. This actuates the armature 14, or, in other words, the rotary shaft 13, and causes the clutch 83 to transmit drive force from the rotary shaft 13 to the worm shaft 82. The drive force is then output from the output shaft 85 with the rotating speed of the rotary shaft 13 reduced by the worm shaft 82 and the worm wheel 84. As a result, in correspondence with the rotating direction of the output shaft 85, the window glass is selectively lowered and raised through the window regulator, which is connected to the output shaft 85.

To assemble the motor portion 2 with the gear housing 61 in the motor 1 configured as described above, the first positioning projections 27d of the support pillars 27 and the second positioning projection 31b of the projecting pillar 31 are engaged with the first positioning recesses 65d of the projecting wall portions 65 and the second positioning recess 66b of the projecting portion 66 in the gear housing 61, respectively. This positions the brush holder 21 and the gear housing 61 in the direction perpendicular to the axial direction.

The distal end portions 27c of the support pillars 27 and the distal end portion 31a of the projecting pillar 31 contact the axial end surfaces 65c (specifically, the reference surfaces 65e) of the projecting wall portions 65 and the axial end surface 66a (specifically, the reference surface 66c) of the projecting portion 66, respectively, in the axial direction. This positions the brush holder 21 in the axial direction and restricts axial movement of the brush holder 21. As a result, the brush holder 21 is supported stably.

Since the first positioning projections 27d are formed in the distal end portions 27c of the support pillars 27, it is unnecessary to enlarge the brush holder 21 in the direction perpendicular to the axial direction to have space for the positioning projections 27d. As a result, the positioning projections 27d are formed in the brush holder 21 but the brush holder 21 is prevented from being enlarged in the direction perpendicular to the axial direction.

The inlet port 68 of the gear housing 61 receives the control IC 72 of the connector portion 4. The first positioning recesses 65d are each formed in the axial end surface 65c of the corresponding projecting wall portion 65, which configures the inlet port 68, at the opposite side to the control IC 72. As a result, the brush holder 21 and the gear housing 61 are positioned in the direction perpendicular to the axial direction at the positions closer to the motor portion 2 than the control IC 72, which is inserted in the inlet port 68. This prevents interference between the first positioning projections 27d of the brush holder 21 and the control IC 72.

The illustrated embodiment has the characteristic advantages described below.

(1) The brush holder 21 has the support pillars 27, which project toward the gear housing 61, and the torsion springs 28, which are supported by the corresponding support pillars 27 to press the feeder brushes 26 against the commutator 16. The positioning projections 27d for positioning with respect to the gear housing 61 in the direction perpendicular to the axial direction project from the distal end portions 27c of the associated support pillars 27. This arrangement makes it unnecessary to enlarge the brush holder 21 in the direction perpendicular to the axial direction to have space for the positioning projections 27d. As a result, the positioning projections 27d are formed in the brush holder 21 without enlarging the brush holder 21 in the direction perpendicular to the axial direction.

(2) The distal end portion 27c of the support pillars 27 axially contact the gear housing 61. This axially positions the brush holder 21 and restricts axial displacement of the brush holder 21. As a result, the brush holder 21 is supported stably.

(3) The positioning portions are the positioning projections 27d, which axially project from the distal end portions 27c of the support pillars 27. By fitting the positioning projections 27d in the gear housing 61, the brush holder 21 is positioned with respect to the gear housing 61 in the direction perpendicular to the axial direction. In this configuration, in which the projections serving as the positioning portions are formed at the distal end portions 27c of the support pillars 27, the positioning portions are formed easily if the support pillars 27 are small-sized, compared to a configuration having recesses serving as the positioning portions formed at the distal end portions 27c of the support pillars 27.

(4) In the brush holder 21, the projecting pillar 31, which projects toward the gear housing 61, is formed independently from the support pillars 27. The projecting pillar 31 configures the capacitor accommodating portion 32, which accommodates the capacitor 34 mounted in the brush holder 21. The second positioning projection 31b for positioning with respect to the gear housing 61 in the direction perpendicular to the axial direction is arranged at the distal end portion 31a of the projecting pillar 31. This improves accuracy for positioning the brush holder 21 in the direction perpendicular to the axial direction. Since the projecting pillar 31 configures the capacitor accommodating portion 32, it is unnecessary to enlarge the brush holder 21 in the direction perpendicular to the axial direction to have space for the positioning portions.

(5) The two support pillars 27 are arranged to be symmetric with respect to the radial straight line (the lateral line L2) that extends on the central axis L3 of the projecting pillar 31 and the axis L1 of the motor portion 2, as viewed in the axial direction. The support pillars 27 are arranged at the opposite positions of the axis L1 of the motor portion 2 with respect to the projecting pillar 31. The distal end portions 27c of the support pillars 27 and the distal end portions 31a of the projecting pillar 31 contact the gear housing 61 in the axial direction. This positions the brush holder 21 stably in the axial direction.

(6) On the opposite side of the axis L1 of the motor portion 2 in the brush holder 21 from the projecting pillar 31, the two brush accommodating portions 25, which accommodate the corresponding feeder brushes 26, are arranged to be symmetric with respect to the radial straight line (the lateral line L2) that passes on the central axis L3 of the projecting pillar 31 and the axis L1 of the motor portion 2 as viewed in the axial direction. The support pillars 27 are arranged between the two brush accommodating portions 25 in the circumferential direction. This allows formation of the brush accommodating portions 25 and the support pillars 27 without enlarging the brush holder 21 in the direction perpendicular to the axial direction. As a result, the size of the motor 1 is reduced in the direction perpendicular to the axial direction.

(7) The holder accommodating portion 64, in which at least the rotary shaft 13 and the terminals 40a, 40b of the motor portion 2 are arranged, is formed at the end of the gear housing 61 facing the yoke 11 in such a manner as to communicate with the inlet port 68. The projecting wall portions 65, each of which configures the wall portion of the inlet port 68 facing the motor portion 2, are formed in the gear housing 61 to project into the holder accommodating portion 64. The first positioning recesses 65d (the gear housing-facing positioning portions) are formed in the surfaces (the axial end surfaces 65c) of the associated projecting wall portions 65 opposite to the control IC 72. The first positioning recesses 65d are engaged with the first positioning projections 27d (the holder-facing positioning portions), which are arranged in the brush holder 21, to position the brush holder 21 and the gear housing 61 in the direction perpendicular to the axial direction. As a result, the brush holder 21 and the gear housing 61 are positioned in the direction perpendicular to the axial direction at the positions closer to the motor portion 2 than the control IC 72, which is received in the inlet port 68. This prevents interference between the positioning portions (the positioning projections 27d and the positioning recesses 65d) of the brush holder 21 and the gear housing 61 and the control IC 72 of the connector portion 4.

(8) The two projecting wall portions 65 are formed along a plane perpendicular to the axial direction. The gear housing 61 has the vent hole 81, which communicates with the exterior extending from the inner opening 81a formed in the wall portion 68a of the inlet port 68 opposite to the motor portion 2. The inner opening 81a of the vent hole 81 is arranged at the position axially overlapped with the position of the gap G between the projecting wall portions 65. In other words, the inner opening 81a of the vent hole 81 separates the projecting wall portions 65 from each other and is located at the position axially overlapped with the position of the gap G. As a result, when the gear housing 61 is molded, a slide mold for shaping the inner opening 81a of the vent hole 81 may be removed through the gap G between the projecting wall portions 65 in the axial direction. The gear housing 61 is thus prevented from being enlarged in the direction perpendicular to the axial direction.

(9) The second positioning recess 66b is arranged at the position opposite to the projecting wall portions 65 and the control IC 72 with respect to the axis L1 of the motor portion 2. The second positioning recess 66b, which is formed independently from the first positioning recesses 65d of the projecting wall portions 65, is located at the position opposite to the control IC 72 of the connector portion 4 with respect to the axis L1 of the motor portion 2. This prevents interference between the second positioning recess 66b and the control IC 72 of the connector portion 4. As a result, the positioning projections 27d, 31b and the positioning recesses 65d, 66b of the gear housing 61 are prevented from interfering with the control IC 72 and the first positioning recesses 65d and the second positioning recess 66b are arranged at the opposite sides of the axis L1. This ensures well-balanced positioning of the gear housing 61 and the brush holder 21 in the direction perpendicular to the axial direction.

(10) The axial end surfaces 65c of the projecting wall portions 65 and the axial end surface 66a of the projecting portion 66 are formed in such a manner that the reference surfaces 65e, 66c, which are formed by raising the circumferences of the corresponding first and second positioning recesses 65d, 66b, are located on a plane perpendicular to the axis L1 of the motor portion 2. The reference surfaces 65e, 66c contact the brush holder 21 in the axial direction to position the brush holder 21 axially, thus restricting axial displacement of the brush holder 21. As a result, the brush holder 21 is supported stably. Further, since the reference surfaces 65e, 66c are formed focally, tests for the axial positions and flatness of the reference surfaces 65e, 66c are easily carried out. Also, adjustment for arranging the reference surfaces 65e, 66c on one plane is facilitated. This improves accuracy for arranging the reference surfaces 65e, 66c, which contact the support pillars 27 and the projecting pillar 31 of the brush holder 21, on one plane. As a result, the gear housing 61 and the brush holder 21 are positioned stably in the axial direction.

(11) The first and second positioning projections 27d, 31b and the corresponding first and second positioning recesses 65d, 66b are arranged on a circumference about the axis L1 of the motor portion 2. This ensures well-balanced positioning.

(12) The projecting wall portions 65 of the gear housing 61 contact the distal end portions 27c of the corresponding support pillars 27 of the brush holder 21 in the axial direction. This axially positions the brush holder 21 and restricts axial displacement of the brush holder 21. As a result, the brush holder 21 is supported stably. Additionally, it is unnecessary to form a portion of the brush holder 21 that axially contacts each projecting wall portion 65 of the gear housing 61 independently from the support pillars 27. As a result, the gear housing 61 and the brush holder 21 are positioned in the axial direction without being enlarged in the direction perpendicular to the axis.

The illustrated embodiment of the present invention may be modified to the forms described below.

In the illustrated embodiment, the positioning projections 27d, 31b and the positioning recesses 65d, 66b are arranged on the circumference about the axis L1 of the motor portion 2. However, arrangement of the positioning projections 27d, 31b and the positioning recesses 65d, 66b is not particularly restricted to that of the embodiment and may be modified as needed in correspondence with the specification.

In the brush holder 21 of the illustrated embodiment, the two support pillars 27 are arranged on the lateral side corresponding to the connector portion 4 and the projecting pillar 31 is formed at the opposite circumferential side to the support pillars 27 (at the lateral side corresponding to the wheel accommodating portion 61e). However, the positions of the support pillars 27 and the position of the projecting pillar 31 may be reversed.

The configurations of the terminals 40a, 40b of the brush holder 21 including the shapes may be modified as needed in correspondence with the specification.

In the illustrated embodiment, the first positioning recesses 65d of the gear housing 61 are arranged in the projecting wall portions 65, which configure the inlet port 68. However, the positions of the first positioning recesses 65d are not particularly restricted to the positions of the embodiment and may be changed as necessary in correspondence with the specification.

In the illustrated embodiment, the positioning projections 27d, 31b may be recesses and the positioning recesses 65d, 66b may be projections.

In the illustrated embodiment, the first positioning projections 27d are formed at the distal end portions 27c of the associated support pillars 27. However, the positions of the first positioning projections 27d are not particularly restricted to the positions of the embodiment and may be modified as needed in correspondence with the specification.

In the illustrated embodiment, the connector portion 4 is detachably attached to the gear housing 61. However, the invention is not particularly restricted to having the connector portion 4 of the embodiment and may include, for example, a connector portion that is formed integrally with the gear housing 61.

Although the torsion springs 28 are employed as the urging members for urging the feeder brushes 26 in the illustrated embodiment, any suitable springs other than the torsion spring 28 may be used as the urging members.

In the illustrated embodiment, the speed reducing mechanism 62 is configured by the worm shaft 82 and the worm wheel 84. However, the speed reducing mechanism 62 is not particularly restricted to this configuration and may be configured by any other suitable gear such as a spur gear.

In the gear housing 61 of the illustrated embodiment, the two projecting wall portions 65 are arranged at the positions laterally close to the connector portion 4. The projecting portion 66 is arranged at the opposite circumferential side to the projecting wall portions 65, or, in other words, the positions laterally close to the wheel accommodating portion 61e. The positions of the projecting wall portions 65 and the position of the projecting portion 66 may be reversed.

Although the commutator 16 and the feeder brushes 26 are arranged in the holder accommodating portion 64 of the gear housing 61 in the illustrated embodiment, the invention is not particularly restricted to this. That is, the commutator 16 and the feeder brushes 26 may be accommodated in the yoke 11.

Although the illustrated embodiment has two projecting wall portions 65, the number of the projecting wall portions 65 may be changed as needed in correspondence with the specification.

In the illustrated embodiment, the distal end portions 27c of the support pillars 27 are held in contact with the gear housing 61 in the axial direction to axially position the brush holder 21. However, the invention is not particularly restricted to this and the distal end portions 27c of the support pillars 27 may be held in contact with the gear housing 61 in the axial direction at other positions than the support pillars 27 of the brush holder 21.

In the illustrated embodiment, the control IC 72 of the connector portion 4 is received in the inlet port 68. However, the invention is not particularly restricted to this configuration and the inserting portion of the connector portion 4 to be inserted into the inlet port 68 may be configured differently as needed in correspondence with the specification. Additionally, the connector portion 4 may include not the control IC 72 but connecting terminals connected to the terminals 40a, 40b.

Although the present invention is employed as the motor 1 used as a drive source for a power window apparatus in the illustrated embodiment, the invention is not particularly restricted to the embodiment. That is, the invention may be used as any suitable motor used as a drive source for other apparatuses than the power window apparatus.

Therefore, the present examples and embodiments are to be considered as illustrative and not restrictive and the invention is not to be limited to the details given herein, but may be modified within the scope and equivalence of the appended claims.

I claim:

1. A motor comprising a motor portion and a speed reducing portion connected to the motor portion, wherein
the motor portion includes:
a yoke housing having an opening;
a rotary shaft that projects from the opening of the yoke housing and defines the axial direction of the motor;
a commutator;
a feeder brush for supplying electric power to the commutator; and
a brush holder that holds the feeder brush, and the speed reducing portion includes:
a gear housing mounted at the opening of the yoke housing; and a speed reducing mechanism arranged in the gear housing, the speed reducing mechanism outputting drive force produced by the rotary shaft of the motor portion while reducing the rotating speed of the rotary shaft, the motor further comprising:

at least one support pillar that is provided in the brush holder, projects toward the gear housing, and has a distal end portion;

an urging member that is arranged in the brush holder and supported by the support pillar, the urging member pressing the feeder brush against the commutator; and a positioning portion provided at the distal end portion of the at least one support pillar, the positioning portion positioning the brush holder with respect to the gear housing in a direction perpendicular to the axial direction of the rotary shaft.

2. The motor according to claim 1, wherein the distal end portion of the at least one support pillar contacts the gear housing along the axial direction of the rotary shaft.

3. The motor according to claim 1, wherein the positioning portion includes a projection that projects from the distal end portion of the at least one support pillar in the axial direction of the rotary shaft.

4. The motor according to claim 1, further comprising a projecting pillar that is arranged in the brush holder, projects toward the gear housing, and has a distal end portion, wherein the projecting pillar configures an electric component accommodating portion for accommodating an electric component mounted in the brush holder, and a projecting pillar positioning portion for positioning the brush holder with respect to the gear housing in the direction perpendicular to the axial direction of the rotary shaft is provided at the distal end portion of the projecting pillar.

5. The motor according to claim 4, wherein the projecting pillar has a central axis, the at least one support pillar is one of a pair of support pillars, as viewed in the axial direction of the rotary shaft, the pair of support pillars are arranged to be symmetric with respect to a radially extending straight line that extends on the central axis of the projecting pillar and the axis of the rotary shaft of the motor portion, the support pillars being arranged on the opposite side of the axis of the rotary shaft of the motor portion with respect to the projecting pillar, and the distal end portion of each of the support pillars and the distal end portion of the projecting pillar contact the gear housing in the axial direction.

6. The motor according to claim 5, further comprising a pair of brush accommodating portions for accommodating the feeder brush, the brush accommodating portions being arranged on the opposite side of the axis of the rotary shaft of the motor portion with respect to the projecting pillar of the brush holder, and, as viewed in the axial direction, the brush accommodating portions being arranged to be symmetric with respect to a radially extending straight line that extends on the central axis of the projecting pillar and the axis of the motor portion, wherein the pair of support pillars are arranged between the brush accommodating portions in a circumferential direction about the rotary shaft.

7. The motor according to claim 1, wherein the gear housing has an inlet port, the motor further comprising:

a terminal electrically connected to the feeder brush; and a connector portion including:

an inserting portion to be inserted into the gear housing through the inlet port; and a connecting terminal that is arranged in the inserting portion and electrically connected to the terminal, wherein the gear housing has an end portion facing the yoke housing, an accommodating portion being formed in the end portion of the gear housing in such a manner as to communicate with the inlet port, and at least the rotary shaft of the motor portion and the terminal being arranged in the accommodating portion, the gear housing includes at least one projecting wall portion that projects into the accommodating portion, the at least one projecting wall portion configuring a wall portion located at the side of the inlet port that faces the motor portion, the positioning portion configures at least one holder positioning portion, and on the opposite side with respect to the inserting portion, the at least one projecting wall portion has an end surface facing the brush holder opposite, and the end surface of the at least one projecting wall portion having at least one gear housing positioning portion that becomes engaged with the at least one holder positioning portion to position the brush holder and the gear housing in the direction perpendicular to the axial direction of the rotary shaft.

8. The motor according to claim 7, wherein the at least one gear housing positioning portion includes a positioning recess recessed along the axial direction of the rotary shaft, and the at least one holder positioning portion includes a positioning projection that is projected along the axial direction of the rotary shaft and engaged with the positioning recess.

9. The motor according to claim 7, wherein the at least one projecting wall portion is one of two projecting wall portions that are arranged on a plane perpendicular to the axial direction of the rotary shaft, a gap being formed between the projecting wall portions, and the gear housing includes an inner opening formed in the wall portion of the inlet port that is on the opposite side with respect to the motor portion, the gear housing having a vent hole that extends from the inner opening and communicates with the exterior of the gear housing, the inner opening being arranged at a position overlapped with the position of the gap in the axial direction of the rotary shaft.

10. The motor according to claim 7, wherein the at least one projecting wall portion contacts the brush holder along the axial direction of the rotary shaft.

11. The motor according to claim 7, wherein the at least one gear housing positioning portion includes at least one first gear housing positioning portion, and the gear housing has a second gear housing positioning portion for positioning with respect to the brush holder in the direction perpendicular to the axial direction of the rotary shaft, the second gear housing positioning portion being arranged at a position on the opposite side of the axis of the rotary shaft of the motor portion with respect to the at least one projecting wall portion and the inserting portion of the connector portion.

12. The motor according to claim 11, wherein the end surface of the at least one projecting wall portion in which the first gear housing positioning portion is formed and the end surface of the gear housing in which the second gear housing positioning portion is arranged each include a reference surface formed by raising a portion surrounding the corresponding one of the first and second gear housing positioning portions, the reference surfaces being arranged on a plane perpendicular to the axis of the rotary shaft of the motor portion, the reference surfaces contacting the brush holder in the axial direction of the rotary shaft.

13. The motor according to claim 7, wherein the distal end portion of the at least one support pillar contacts the at least one projecting wall portion of the gear housing in the axial direction of the rotary shaft.

14. The motor according to claim 13, wherein
the gear housing positioning portion formed in the at least one projecting wall portion includes at least one first gear housing positioning portion, the gear housing has a second gear housing positioning portion for positioning with respect to the brush holder in the direction perpendicular to the axial direction of the rotary shaft, the second gear housing positioning portion being arranged at a position on the opposite side of the axis of the rotary shaft with respect to the at least projecting wall portion and the inserting portion of the connector portion, the brush holder includes a projecting pillar that projects toward the gear housing and has a distal end portion, the projecting pillar configures an electric component accommodating portion for accommodating an electric component mounted in the brush holder, and
the distal end portion of the projecting pillar has a projecting pillar positioning portion that becomes engaged with the second gear housing positioning portion to position the brush holder and the gear housing in the direction perpendicular to the axial direction of the rotary shaft.

15. The motor according to claim 14, wherein
the projecting pillar has a central axis,
the at least one support pillar is one a pair of support pillars, as viewed in the axial direction of the rotary shaft, the pair of support pillars are arranged to be symmetric with respect to a radially extending straight line that extends on the central axis of the projecting pillar and the axis of the rotary shaft of the motor portion, the support pillars being arranged on the opposite side of the axis of the rotary shaft of the motor portion with respect to the projecting pillar, and
a distal end portion of each of the support pillars and the distal end portion of the projecting pillar contact the gear housing in the axial direction of the rotary shaft.

16. The motor according to claim 15, further comprising a pair of brush accommodating portions for accommodating the feeder brush, the brush accommodating portions being arranged on the opposite side of the axis of the rotary shaft of the motor portion with respect to the projecting pillar of the brush holder, and, as viewed in the axial direction of the rotary shaft, the brush accommodating portions being arranged to be symmetric with respect to a radially extending straight line that extends on the central axis of the projecting pillar and the axis of the rotary shaft of the motor portion, and
wherein the pair of support pillars are arranged between the brush accommodating portions in a circumferential direction about the rotary shaft.

17. The motor according to claim 16, wherein the holder positioning portion, the projecting pillar positioning portion, the first gear housing positioning portion corresponding to the holder positioning portion, and the second gear housing positioning portion corresponding to the projecting pillar positioning portion are arranged on one circle the center of which coincides with the axis of the rotary shaft of the motor portion.

* * * * *